US011704081B2

(12) United States Patent
Horiike et al.

(10) Patent No.: US 11,704,081 B2
(45) Date of Patent: Jul. 18, 2023

(54) INFORMATION PROCESSING APPARATUS, CONTROL METHOD, AND STORAGE MEDIUM

(71) Applicant: CANON KABUSHIKI KAISHA, Tokyo (JP)

(72) Inventors: Norikazu Horiike, Tokyo (JP); Yoshinori Hashimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/722,484

(22) Filed: Apr. 18, 2022

(65) Prior Publication Data

US 2022/0334778 A1 Oct. 20, 2022

(30) Foreign Application Priority Data

Apr. 16, 2021 (JP) ................................ 2021-069642

(51) Int. Cl.
*G06F 3/12* (2006.01)
*B42C 19/02* (2006.01)

(52) U.S. Cl.
CPC ............ *G06F 3/125* (2013.01); *G06F 3/1208* (2013.01); *B42C 19/02* (2013.01)

(58) Field of Classification Search
CPC .... G06F 3/04845; G06F 3/125; G06F 3/1208; B42C 19/02; H04N 1/3873
See application file for complete search history.

(56) References Cited

U.S. PATENT DOCUMENTS 5,650,861 A 7/1997 Nakajima et al.
2007/0058214 A1* 3/2007 Honma .............. H04N 1/00811 358/540
2017/0187892 A1* 6/2017 Abe ...................... G06F 3/1208
2018/0032481 A1* 2/2018 Ishida ................... G06F 40/163
2022/0058001 A1* 2/2022 Chang ................. G06F 3/04845

FOREIGN PATENT DOCUMENTS

JP 4006242 B2 11/2007

* cited by examiner

*Primary Examiner* — Iriana Cruz
(74) *Attorney, Agent, or Firm* — Venable LLP

(57) ABSTRACT

An information processing apparatus includes: an obtaining unit configured to obtain book data; a cutout unit configured to cut out a page based on the book data; a providing unit configured to provide an image based on the book data to a binding portion of the cut-out page; and an output unit configured to output data including the page including the image provided by the providing unit.

23 Claims, 18 Drawing Sheets

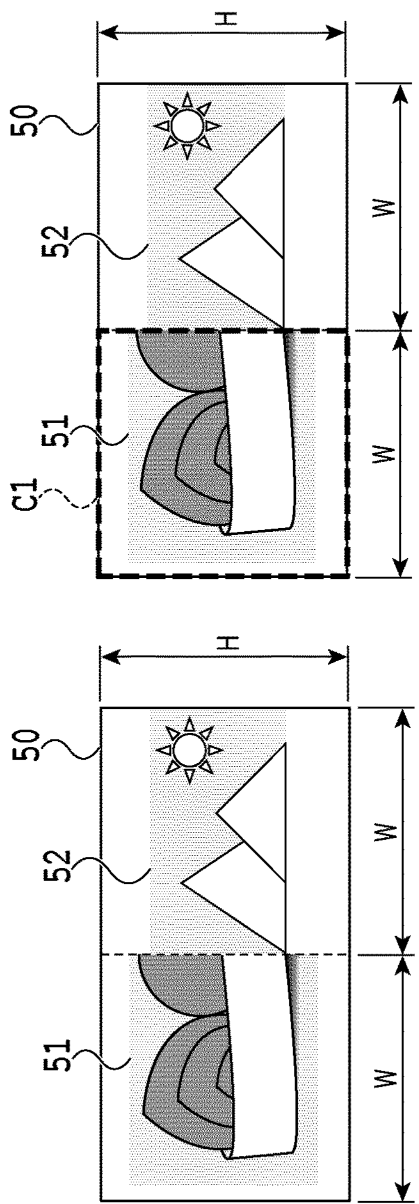
50
51
52
C1
W
H
FIG.6A
FIG.6B
FIG.6C
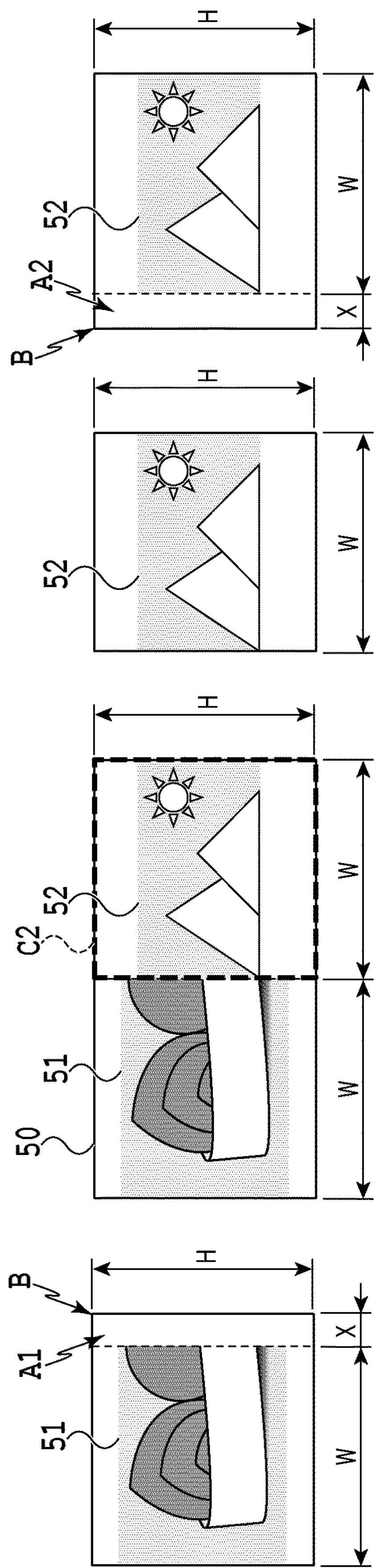
50
51
52
C2
A1
A2
B
X
W
H
FIG.6D
FIG.6E
FIG.6F
FIG.6G

INFORMATION PROCESSING APPARATUS, CONTROL METHOD, AND STORAGE MEDIUM

BACKGROUND

Field

The present disclosure relates to a technique of processing book data.

Description of the Related Art

Bookbinding methods of photo albums and books include a method of performing bookbinding by outputting data in unit of one page of a spread. Perfect binding is an example of the aforementioned bookbinding method. The perfect binding is a binding method in which a spine of a book is hardened with glue (adhesive). Since a book can be finished quickly at low cost, the prefect binding is a widespread bookbinding method.

In Japanese Patent No. 4006242 (hereinafter, referred to as Literature 1), a reading apparatus (scanner) performs correction arrangement in which an image is resized depending on a read result of an image near a binding portion. The image is thereby printed all the way up to a margin region in the binding portion and elimination of a seam in the binding portion is achieved.

SUMMARY

However, in the case where the function of Literature 1 is used, the size of an object included in an image is changed by the resizing of the image. Specifically, an output result after the bookbinding varies from a design result in layout software.

An information processing apparatus according to one aspect of the present disclosure includes: an obtaining unit configured to obtain book data; a cutout unit configured to cut out a page based on the book data; A providing unit configured to provide an image based on the book data to a binding portion of the cut-out page; and an output unit configured to output data including the page including the image provided by the providing unit.

Further features of the present disclosure will become apparent from the following description of exemplary embodiments with reference to the attached drawings.

BRIEF DESCRIPTION OF THE DRAWINGS

FIGS. 6A to 6G are views illustrating an example of print data outputted by the print data creating software;

DESCRIPTION OF THE EMBODIMENTS

Embodiment 1

(Information Processing Apparatus)

Figure 1:
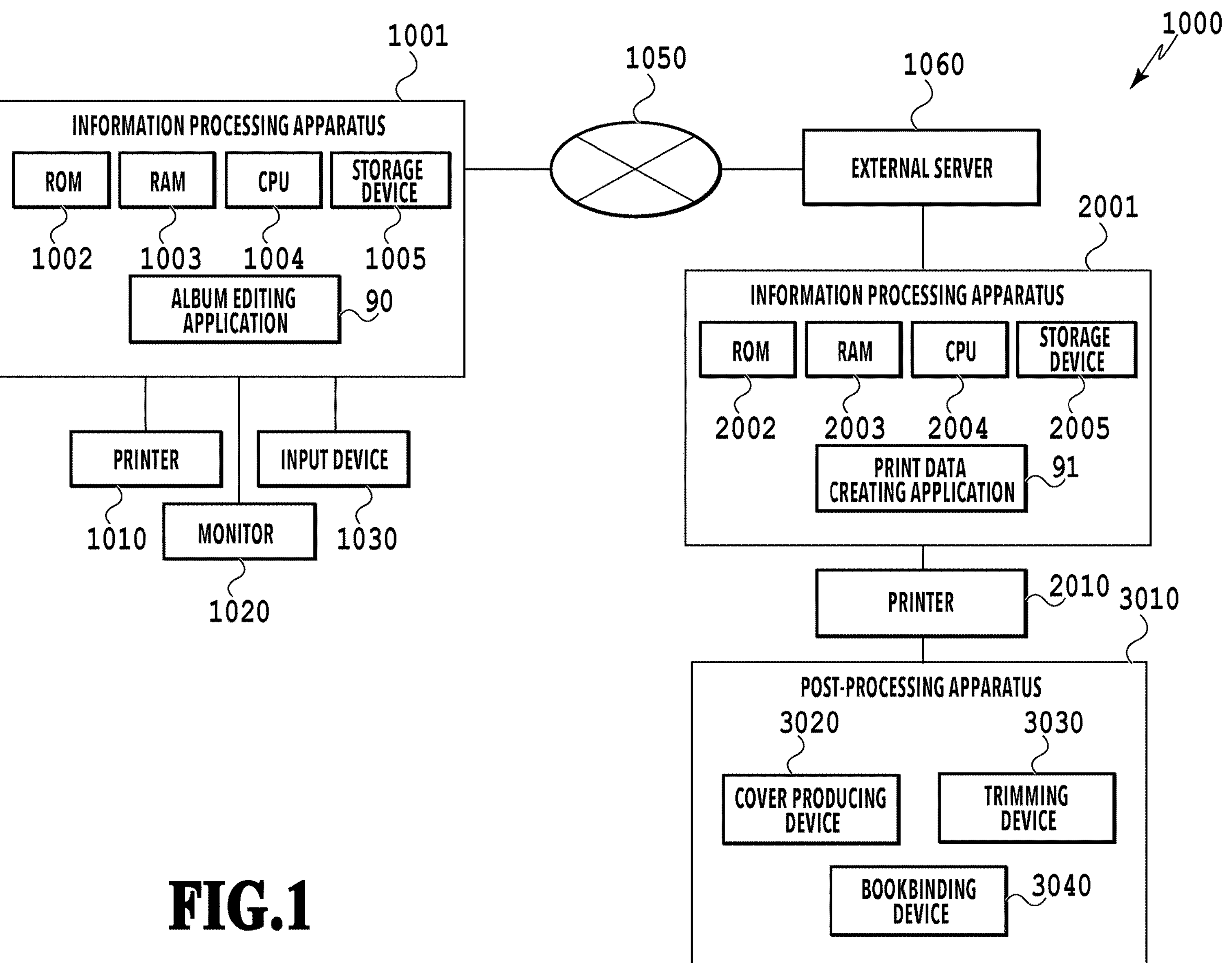
FIG. 1 is a diagram illustrating an example of a configuration of a print system.

FIG. 1 is a diagram illustrating a configuration of a print system 1000 according to the present embodiment. First, a configuration of an information processing apparatus 1001 according to the present embodiment is described. The information processing apparatus 1001 can output album data to a printer 1010 as print data or upload the album data to an external server 1060. The information processing apparatus 1001 includes a ROM 1002, a RAM 1003, a CPU 1004, and a storage device 1005. Moreover, the printer 1010, a monitor 1020, and an input device 1030 are connected to the information processing apparatus 1001. Furthermore, the information processing apparatus 1001 includes an input-output interface (not illustrated) for connection with a network 1050. Note that the album data includes multiple pieces of spread data. The spread data may be data in which images are arranged or data including pieces of image data to be used and arrangement information of the pieces of image data. Note that "spread" corresponds to, for example, one display window in display and, in a printed product, corresponds to a pair of pages (that is two pages) that are adjacent to each other and that can be viewed simultaneously by a user in the case where a book is opened. Note that there are the case where the two pages in the spread are printed on different sheets, respectively, and the sheets are bound such that the two pages are arranged adjacent to each other to form a spread and the case where the two pages in the spread are printed on one sheet and the sheet is folded at the middle to form a spread.

The CPU 1004 is a central processing unit and controls the entire information processing apparatus 1001 by executing an operating system program (hereinafter, abbreviated as OS) stored in the storage device 1005, the ROM 1002, or the RAM 1003. Moreover, the CPU 1004 executes a program stored in the ROM 1002 or the RAM 1003 to execute various functions of the information processing apparatus 1001. The ROM 1002 stores various programs. The RAM 1003 is a random access memory and is used as a work memory of the CPU 1004. Moreover, the various programs are stored in the RAM 1003 in the case where the RAM 1003 is a non-volatile RAM.

Figure 2:
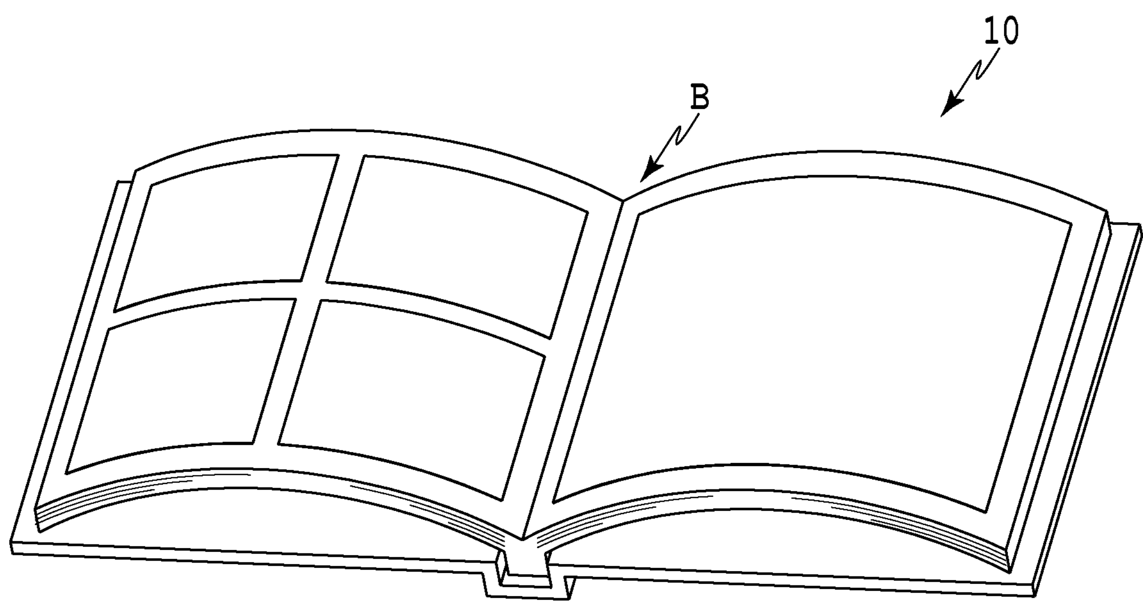
FIG. 2 is a schematic view illustrating an example of an album.

FIG. 2 is a view illustrating an album 10 created by using the album data outputted from an album editing application 90. The album 10 is a photo album, a photo book, or the like. Although the album 10 is described as an example of the printed product in the present embodiment, the present disclosure can be applied to general layout software that outputs not only the album 10 but also other printed products.

The album editing application 90 is held in the ROM 1002 of the information processing apparatus 1001. The information processing apparatus 1001 is capable of communicating with the external server 1060 via the network 1050 (specifically, the Internet). The album data created in the information processing apparatus 1001 is uploaded to the external server 1060 via the network 1050. The user uploads the album data created in the information processing apparatus 1001 to the external server 1060 and performs a necessary album purchase procedure. In the case where these user operations are appropriately performed, the external server 1060 transmits print data based on the album data to an information processing apparatus 2001. In addition, the external server 1060 receives an order of album creation, manages the order of album creation, and creates the print data based on the album data to give an instruction of printing.

The information processing apparatus 2001 includes a ROM 2002, a RAM 2003, a CPU 2004, and a storage device 2005 like the information processing apparatus 1001. Since the roles of the respective units are the same as those in the information processing apparatus 1001, description thereof is omitted. A print data creating application 91 is held in the ROM 2002 of the information processing apparatus 2001. The print data creating application 91 can create the print data based on the inputted album data. Moreover, the information processing apparatus 2001 includes an input-output interface (not illustrated) for connection with a printer 2010 and is capable of communicating with the printer 2010 via the input-output interface. The information processing apparatus 2001 downloads the album data in the external server 1060, generates the print data based on the album data, and transmits the print data to the printer 2010.

Then, printed products printed by the printer 2010 are bound into a book by a post-processing apparatus 3010. In a bookbinding step, the printed products are sorted into cover pages and pages other than a cover. A cover producing device 3020 folds back end portions of the cover pages with respect to a cardboard to create the cover. Moreover, a trimming device 3030 trims the pages other than the cover to align end portions. Thereafter, a bookbinding device 3040 binds the cover pages and the pages other than the cover into a book and the book is delivered to the user as the album 10 as illustrated in FIG. 2.

The printer 1010 prints the print data based on the album data created in the information processing apparatus 1001. For example, the user binds printed products printed in the printer 1010 into a book. The monitor 1020 is a display device that displays image information outputted in the information processing apparatus 1001. The input device 1030 is an input device such as a keyboard or a pointing device used to perform input on the information processing apparatus 1001. The mode of the input device includes a touch panel in which the input device is integral with the monitor and input is performed by directly touching the monitor. The storage device 1005 is a storage device such as an HDD or an SSD in which image data, templates, and the like are stored. Note that the configuration illustrated in FIG. 1 is an example and a different mode may be employed. For example, a configuration in which the information processing apparatus 1001 includes the monitor 1020 or the input device 1030 may be employed.

(Album Editing Application)

Figure 3:
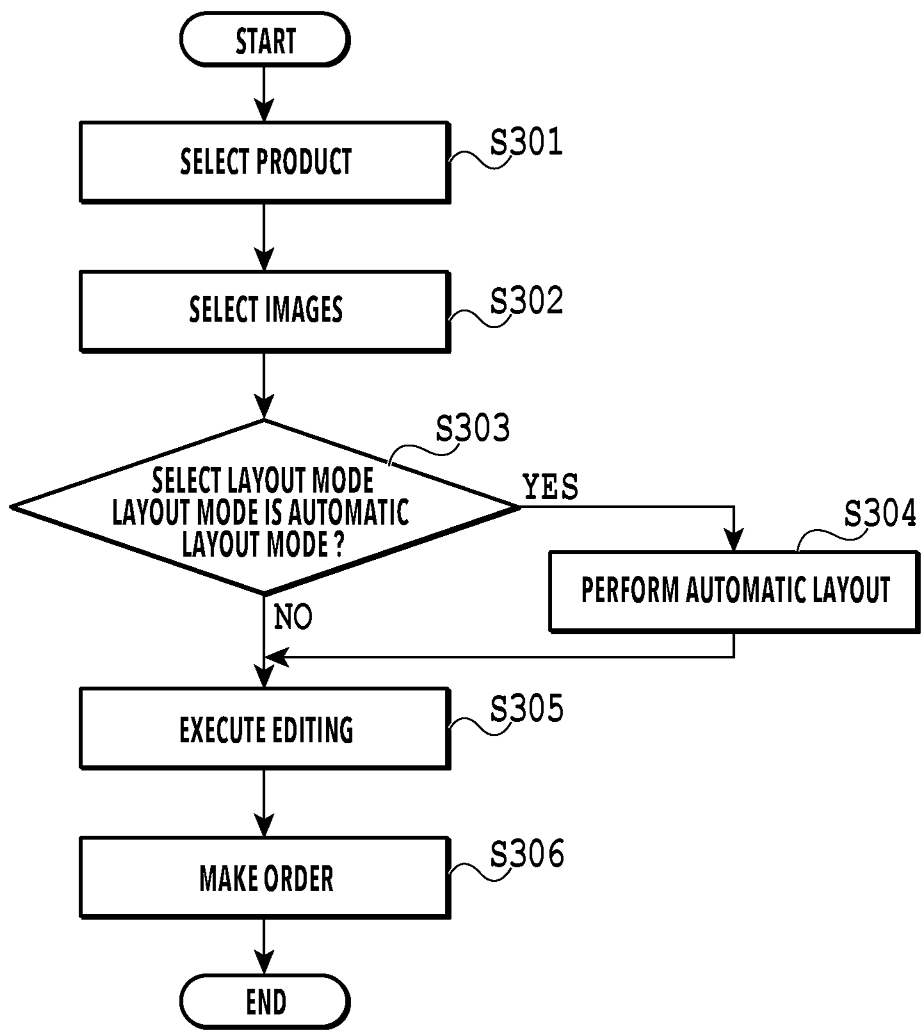
FIG. 3 is a flowchart illustrating processing of album editing software.
Figure 4:
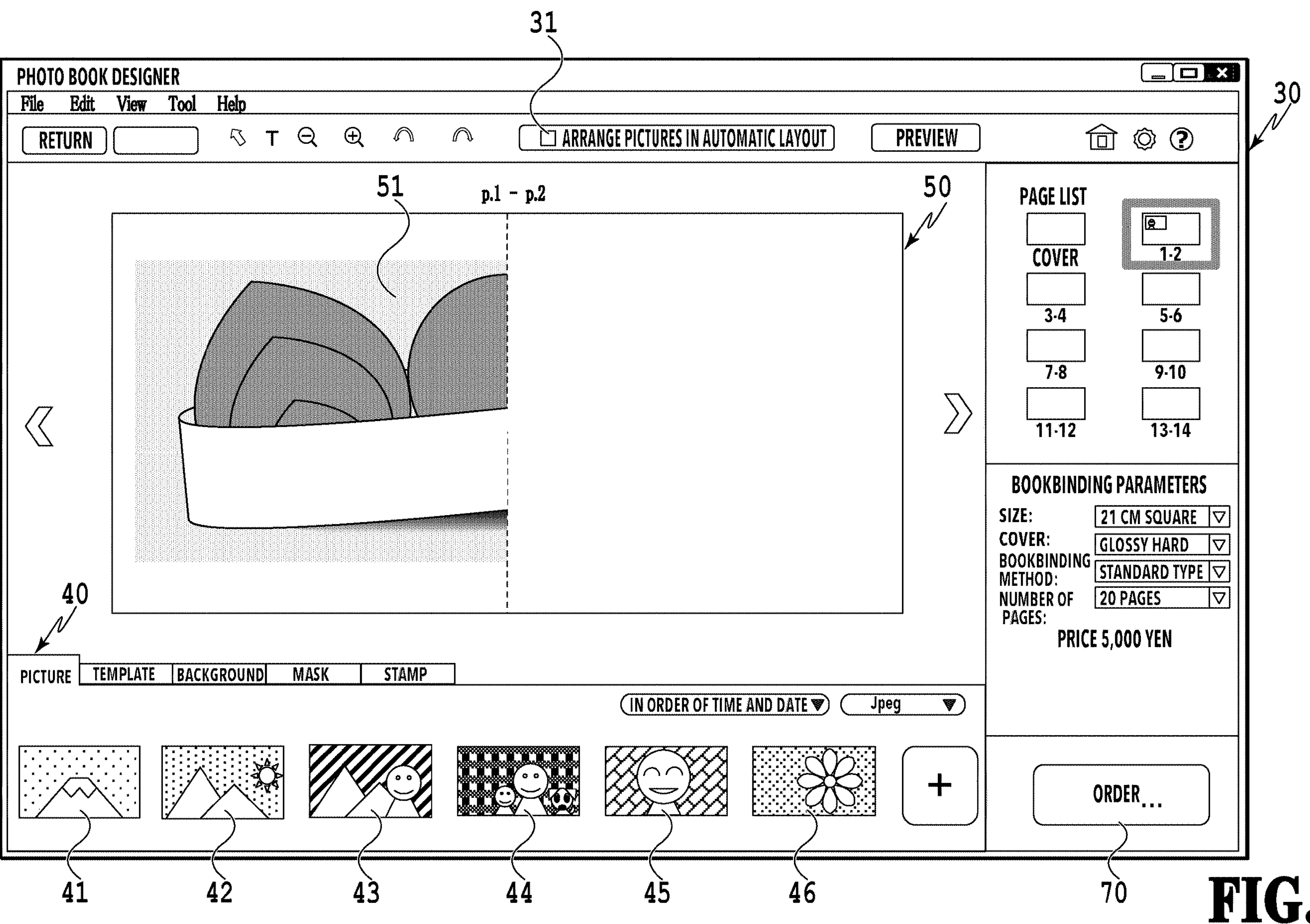
FIG. 4 is a view illustrating an example of an editing screen provided by the album editing software.

Next, processing of the album editing application is described by using FIGS. 3 and 4.

FIG. 3 is a flowchart illustrating processing of layout editing and order. The CPU 1004 of the information processing apparatus 1001 loads a program code stored in the ROM 1002 to the RAM 1003 and executes the program code to execute the flowchart illustrated in FIG. 3. Note that in the flowcharts described below, sign "S" in the description of the processes means step in the flowcharts.

In the case where the user activates the album editing application 90, the processing of FIG. 3 is started. First, in S301, the information processing apparatus 1001 receives selection of a product made by the user. Specifically, the size of the album, the type of the cover, the bookbinding method, the total number of pages in the album, the type of sheets, and the like are set in response to operations of the user. Here, the bookbinding method is, for example, full-flat binding or the perfect binding described above. In the case where an album than can be opened 180 degrees in a full-flat shape is to be created, the full-flat binding is selected. In the case where a low-cost album is to be created, the perfect binding is selected.

After the setting operation of the product selection, in S302, the information processing apparatus 1001 receives selection of the image data made by the user. In the case where the user selects a desired folder, a list screen of pieces of image data saved in the selected folder is displayed. The user selects images by using this screen and the information processing apparatus 1001 can thereby receive the image data.

After the completion of the image selection, in S303, the information processing apparatus 1001 determines whether an automatic layout mode is selected as a layout mode, depending on the operation of the user. The automatic layout mode is a mode in which images are automatically arranged in a layout screen without arrangement of images through user operations. Moreover, a process of determining the size of each piece of image data is also automatically performed. Other layout modes include a manual layout mode in which images are arranged through user operations. In the case where the information processing apparatus 1001 determines that the automatic layout mode is selected in S303, the processing proceeds to S304. Meanwhile, in the case where the manual layout mode is selected in S303, the processing proceeds to S305.

In S304, the information processing apparatus 1001 performs an automatic layout process. The information processing apparatus 1001 evaluates the pieces of image data selected in S302 by using the album editing application 90 and gives a score to each piece of image data. Then, the information processing apparatus 1001 selects pieces of image data to be arranged in the album data based on the score given to each piece of image data. Description of criteria based on which the score is given to each piece of image data is omitted. The information processing apparatus 1001 lays out the pieces of image data selected in S302 in spreads. As described above, in the automatic layout process, the process of determining in which spread each piece of image data is to be arranged and the process of determining the size of each piece of image data are automatically performed.

In the case where the manual layout mode is selected in S303 or in the case where the automatic layout in S304 is completed, the processing proceeds to S305. In S305, the information processing apparatus 1001 executes an editing process.

FIG. 4 is a view illustrating an example of an editing screen provided by the album editing application 90. The editing screen 30 of FIG. 4 includes a check box 31 for switching the layout mode, an order button 70, and an image selection region 40. The check box 31 receives the selection of performing the automatic layout or the manual layout. In the image selection region 40, images 41 to 46 selected in S302 are displayed. Moreover, the editing screen 30 includes a spread region 50 of the album. Note that FIG. 4 illustrates a result in which the user has arranged an image 51 in the spread region 50 of the editing screen 30 in a default state.

In the case where the editing is executed through the automatic layout, the information processing apparatus 1001 displays the editing screen 30 in a state where all pieces of image data selected in S302 are each laid out in one of the spread regions 50 of the pages, on the monitor 1020. The user can further switch the images, change a background color, add a stamp, or perform other similar editing operations from this state by performing a user operation.

Meanwhile, in the case where the editing is executed without intervention of the automatic layout (that is in the case where the manual layout is selected), the information processing apparatus 1001 displays the editing screen 30 in a state where no images are arranged in any of the spread regions 50 of the pages, on the monitor 1020. In this case, the user performs an operation of adding images to the spread region 50 by himself/herself to create a desired layout. Moreover, in this process, the user can further switch the images, change the background color, add a stamp, or perform other similar editing operations. In the case where the editing is completed, the processing proceeds to S306.

Selection of the order button 70 by the user in S306 causes the information processing apparatus 1001 to receive the order and perform an order process of the album edited as described above. Thereafter, the present flow is completed. This is the outline of the album creation.

(Print Data Creating Application)

Figure 5:
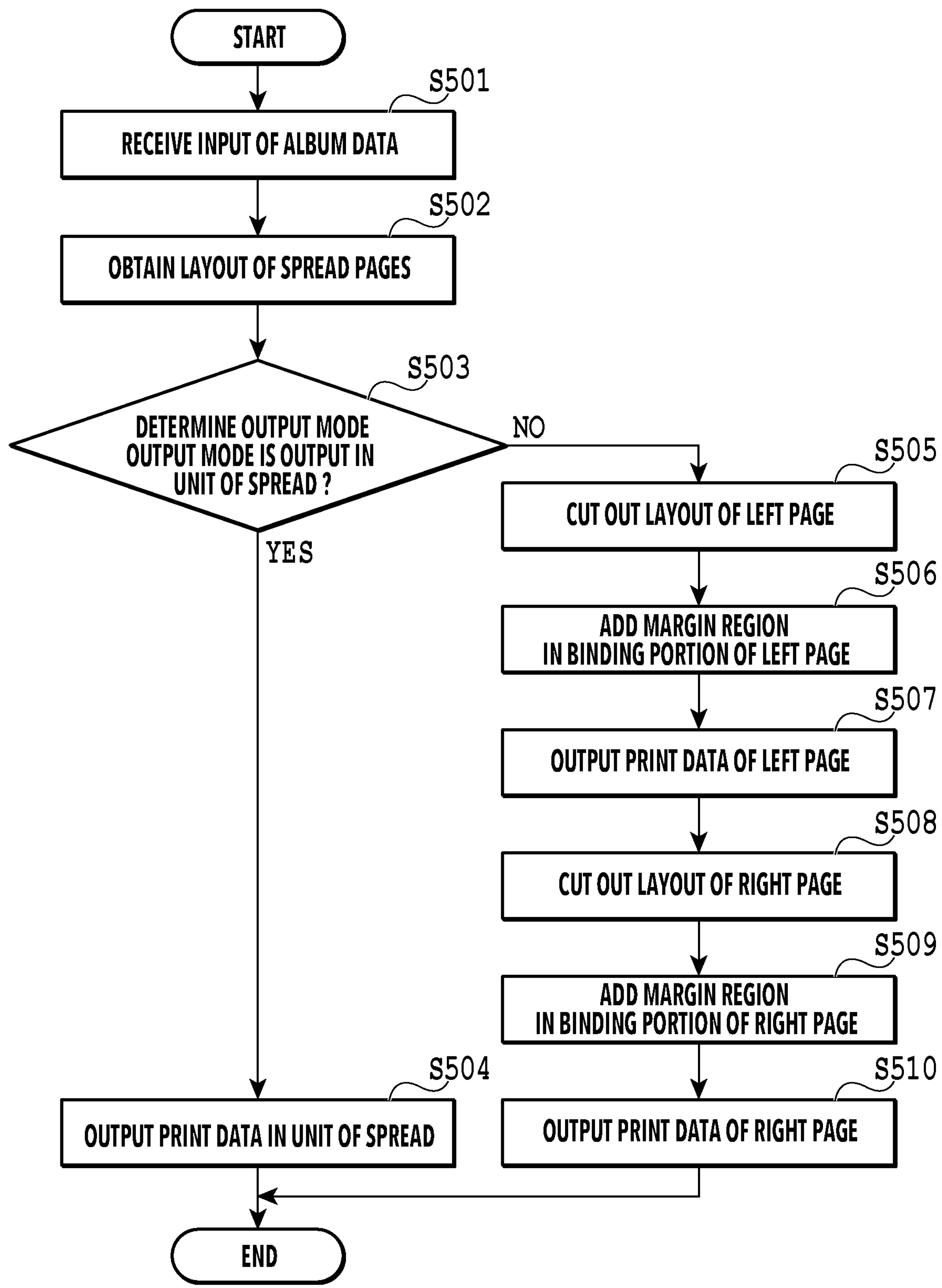
FIG. 5 is a flowchart illustrating processing of print data creating software.

FIG. 5 is a diagram illustrating a flow of data output processing in the print data creating application 91. Moreover, FIGS. 6A to 6G are views illustrating the print data in the respective steps of the flow of FIG. 5 in the print data creating application 91. The flow of the processing of the print data creating application 91 is described by using FIGS. 5 to 6G. The CPU 2004 of the information processing apparatus 2001 loads a program code stored in the ROM 2002 onto the RAM 2003 and executes the program code to execute the flowchart illustrated in FIG. 5 and the same applies to the flowcharts beyond FIG. 5.

In the case where the information processing apparatus 2001 receives the album data, the information processing apparatus 2001 activates the print data creating application 91 and starts the present processing. First, in S501, the information processing apparatus 2001 receives input of the album data. In S502, the information processing apparatus 2001 obtains the layout of the spread region 50 as illustrated in FIG. 6A from the inputted album data. FIG. 6A is an example of a layout in which an image 51 is arranged in the left page of the spread region 50 and an image 52 is arranged in the right page of the spread region 50. Note that W denotes the width of one page and H denotes the height of the page.

Next, in S503, the information processing apparatus 2001 determines an output mode based on product information in the album data. Note that the product information is the aforementioned full-flat binding product, the aforementioned perfect binding product, or the like. In this case, in the full-flat binding product, since the back surfaces of pages adjacent to each other are bonded to each other, pages forming a spread need to be outputted as one piece of print data. Meanwhile, in the perfect binding product, since the spine of the book is hardened with glue (adhesive), left and right pages forming a spread need to be outputted as separate pieces of print data. In the case where the information processing apparatus 2001 determines that the product information is the full-flat binding product, that is the output mode is output in unit of spread in S503, the processing proceeds to S504 and the information processing apparatus 2001 outputs print data in unit of spread.

Meanwhile, in the case where the information processing apparatus 2001 determines that the product information is the perfect binding product, that is the output mode is output in unit of one page in S503, the processing proceeds to S505 and the information processing apparatus 2001 performs a process of cutting out the left page in a cutout region C1 as illustrated in FIG. 6B. FIG. 6C is data after the process of cutting out the left page in S505. Next, in S506, the information processing apparatus 2001 adds a margin region A1 on the binding portion B side of the left page as illustrated in FIG. 6D. X in FIG. 6D denotes the width of the margin region A1 and can be set as, for example, X=3 mm depending on the steps, the performance of the post-processing apparatus 3010, or the like. After the margin region A1 is added in S506, the processing proceeds to S507 and the information processing apparatus 2001 outputs the processed page as the print data of the left page.

In the case where the print data of the left page is outputted in S507, the processing then transfers to a process of the right page. In S508, the information processing apparatus 2001 performs a process of cutting out the right page in a cutout region C2 as illustrated in FIG. 6E. FIG. 6F is data after the process of cutting out the right page in S508. In S509, the information processing apparatus 2001 adds a margin region A2 on the binding portion B side of the right page as illustrated in FIG. 6G. Note that X in FIG. 6G denotes the width of the margin region A2 and can be set as described above. After the margin region A2 is added in S509, in S510, the information processing apparatus 2001 outputs the processed page as the print data of the right page.

That is the outline of the print data output and an output process is performed in the printer 2010 in a back-end process, based on these pieces of print data. Thereafter, a bookbinding process is performed in the bookbinding device 3040 and, in the case of, for example, the perfect binding product, the spine of the book is hardened with glue (adhesive) by using the added margin regions A1 and A2 and the album is thus completed. Note that, in the following description, margin regions added to provide images such as A1 and A2 are collectively referred to as added regions.

(Addition of Print Data to Binding Portion)

Next, description is given of addition of print data to the binding portion that is the characteristic of the present embodiment. In the embodiment, the print data outputted in unit of one page as in the perfect binding product is created by using the print data creating application 91 such that a seam of the added region for bookbinding in the binding portion is not visible in the print data. Specifically, description is given of a method of providing an image, obtained by extending a predetermined region of an arranged image arranged in this page, to the added region. Note that the predetermined region may be, for example, a region of "vertical height: a vertical length of the page × horizontal width: variable width" near the added region. Alternatively, a provided image to be provided to the added region may be created from any portion of the arranged image.

Figure 7:
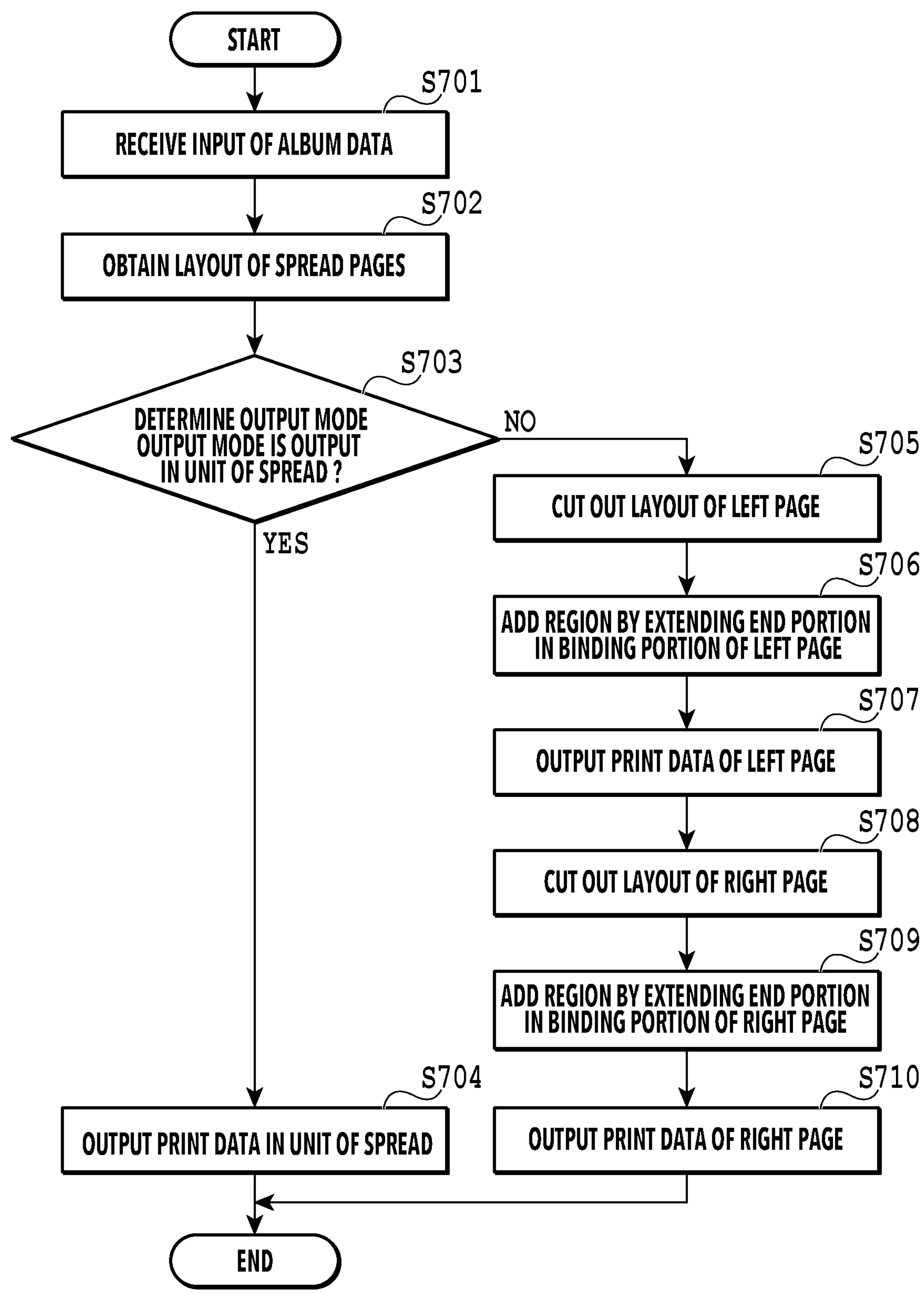
FIG. 7 is a flowchart illustrating processing of the print data creating software.

FIG. 7 is a flowchart illustrating processing of the present embodiment. Moreover, FIGS. 8A to 8D are views illustrating the print data in the respective steps of the flow of FIG. 7 in the print data creating application 91. Note that, since S701 to S704 in FIG. 7 are the same processes as S501 to S504 in FIG. 5, description thereof is omitted.

Figure 8A:
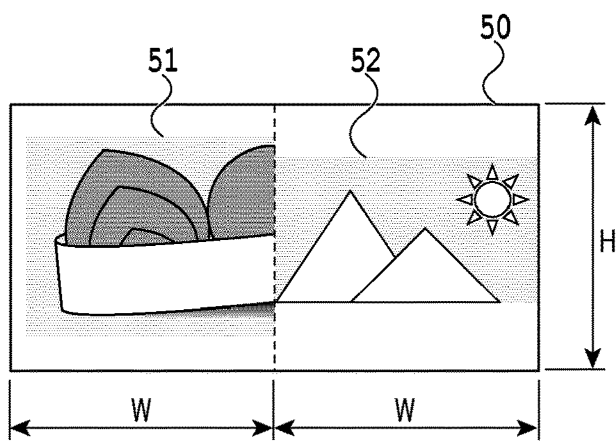
FIGS. 8A to 8D are views illustrating an example of the print data outputted by the print data creating software.
Figure 8B:
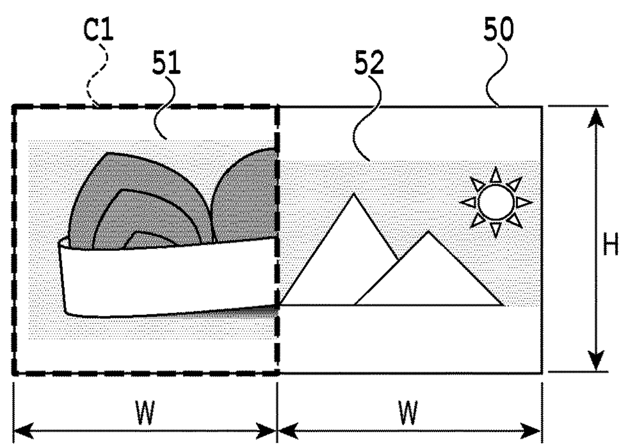
Figure 8C:
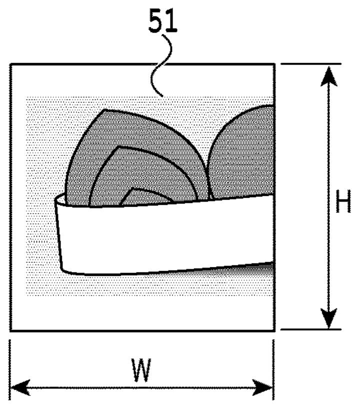
Figure 8D:
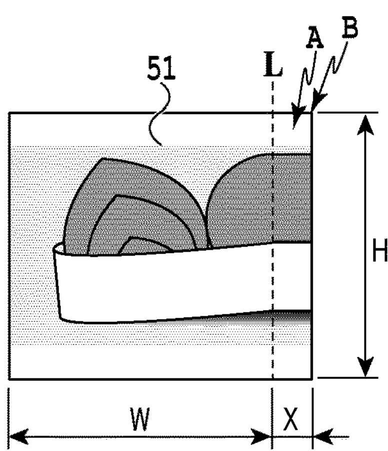
Figure 9A:
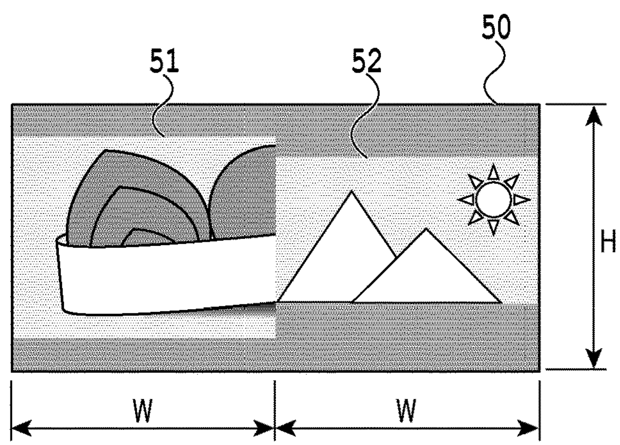
FIGS. 9A to 9D are views illustrating an example of the print data outputted by the print data creating software.
Figure 9B:
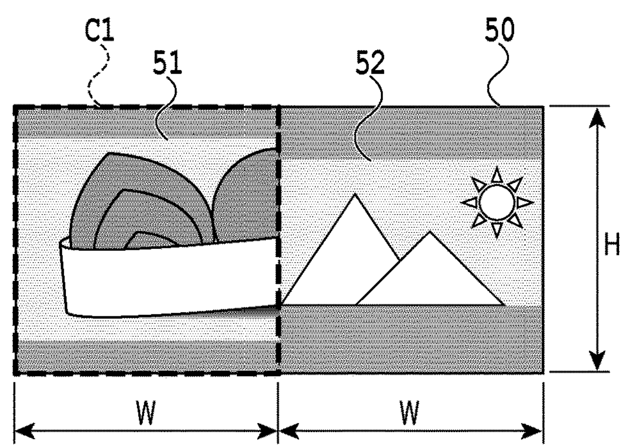
Figure 9C:
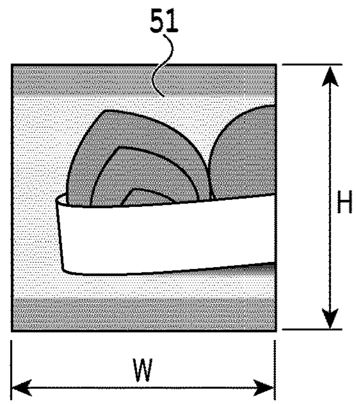
Figure 9D:
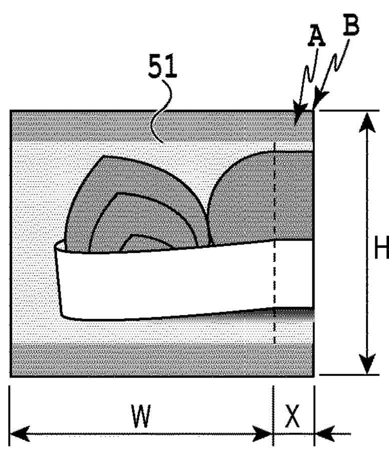
Figure 10A:
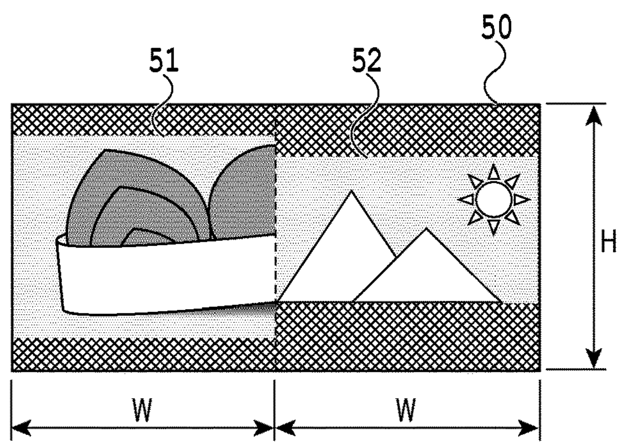
FIGS. 10A to 10D are views illustrating an example of the print data outputted by the print data creating software.
Figure 10B:
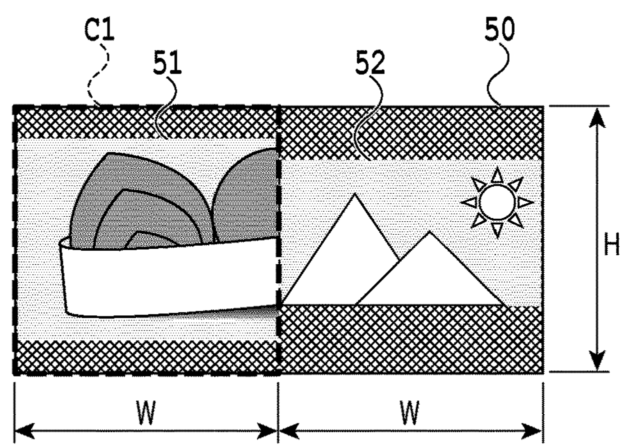
Figure 10C:
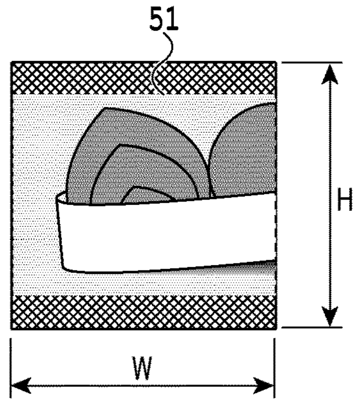
Figure 10D:
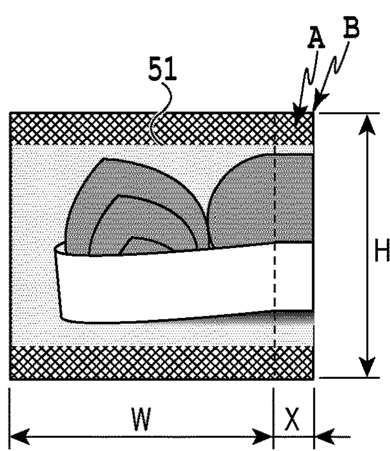

FIG. 8A is a layout view of the spread region 50 obtained by the information processing apparatus 2001 in S702. In S705, the information processing apparatus 2001 performs the process of cutting out the left page in the cutout region C1 as illustrated in FIG. 8B. FIG. 8C is data after the process of cutting out the left page in S705. In S706, the information processing apparatus 2001 duplicates pixels near the spread center L for X in the width direction and adds a region A on the binding portion B side of the left page as illustrated in FIG. 8D. Note that X in FIG. 8D denotes the width of the added region A and can be set as described above depending on the steps and the performance of the post-processing apparatus 3010. After the print data region A is added in S706, in S707, the information processing apparatus 2001 outputs the processed page as the print data of the left page.

In the case where the print data of the left page is outputted in S707, the processing then transfers to the process of the right page. Since the flow of the process of the right page is the same as that of the left page described above, detailed description using illustrations is not given and description is given by using the flowchart of FIG. 7. In S708, the information processing apparatus 2001 performs the process of cutting out the right page from the layout of the spread. In S709, the information processing apparatus 2001 duplicates pixels near the spread center L for X in the width direction and adds the region A on the binding portion B side of the right page. After the print data region A is added in S709, in S710, the information processing apparatus 2001 outputs the processed page as the print data of the right page.

That is the outline of the print data output and the output process is performed in the printer 2010 in a back-end process, based on these pieces of print data. Thereafter, the bookbinding process is performed in the bookbinding device 3040 and, in the case of, for example, the perfect binding product, the spine of the book is hardened with glue (adhesive) by using the added regions A and the album is thus completed.

FIGS. 9A to 9D are pieces of print image data in the respective steps of the flow in the case where the flow of FIG. 7 is executed on a page with a background color. Moreover, FIGS. 10A to 10D are pieces of print image data in the respective steps of the flow in the case where the flow of FIG. 7 is executed on a page with a background pattern. The background pattern refers to a pattern in which designs, pictures, figures, or the like are regularly or irregularly arranged. In the case where the layout of the spread obtained in S702 includes the background color or the background pattern, the print data of the left page created in the series of processes in FIG. 7 is as illustrated in FIGS. 9A to 9D or FIGS. 10A to 10D. Specifically, the cutout process and the duplication process to the added regions A are performed with the background color or the background pattern included in the print data.

As described above, in the embodiment, the quality of the binding portion is improved. Specifically, the nearby pixels are duplicated to create the print data in the added regions for bookbinding in the binding portion. This can eliminate a seam in the print region of the binding portion and improve quality in a product bound into a book by outputting data in unit of one page as in the perfect binding product. Moreover, in the embodiment, the process of providing images to the added regions in the spread is performed and the arranged images arranged in the spread are not processed. Accordingly, it is possible to eliminate a risk that the slot size of the album image is changed.

Embodiment 2

Next, Embodiment 2 is described. The present embodiment is different from Embodiment 1 in that the added regions are created by using the background color instead of the nearby images.

Figure 11:
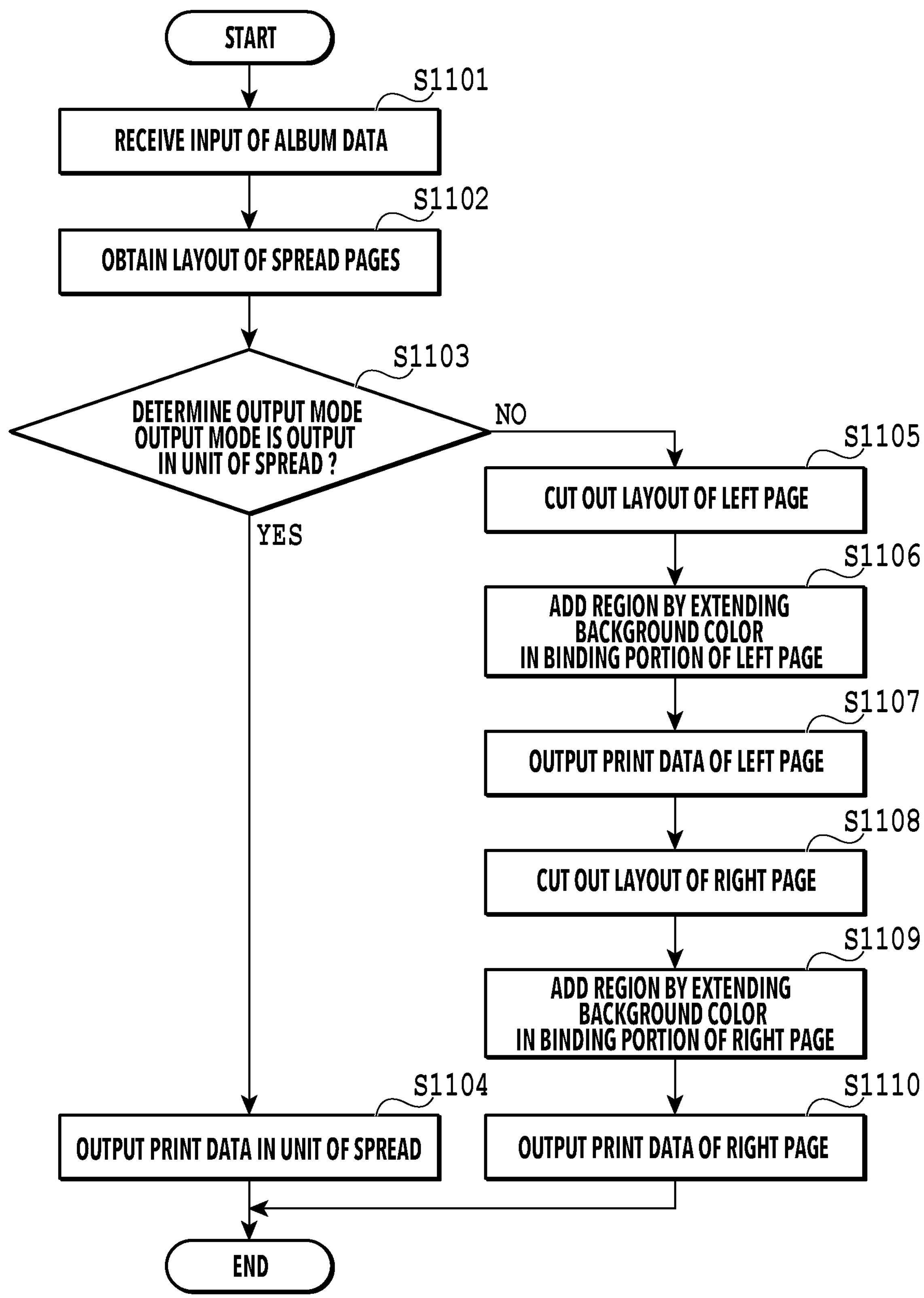
FIG. 11 is a flowchart illustrating processing of the print data creating software.
Figure 12A:
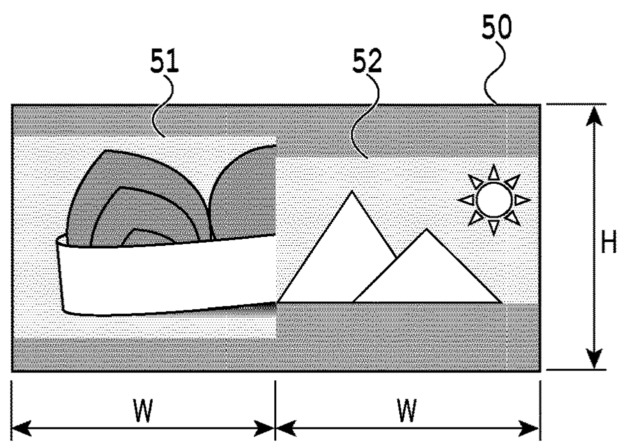
FIGS. 12A to 12D are views illustrating an example of the print data outputted by the print data creating software.
Figure 12B:
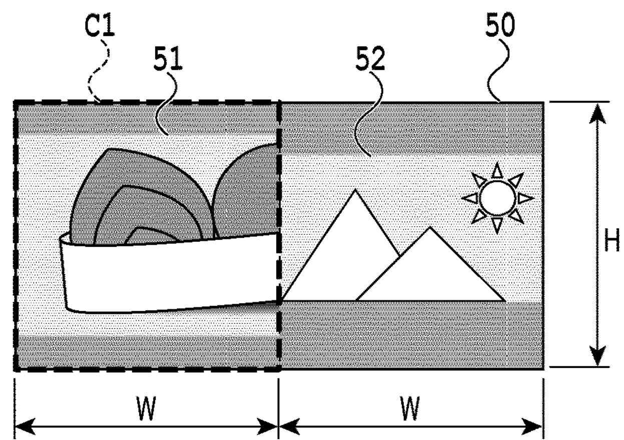
Figure 12C:
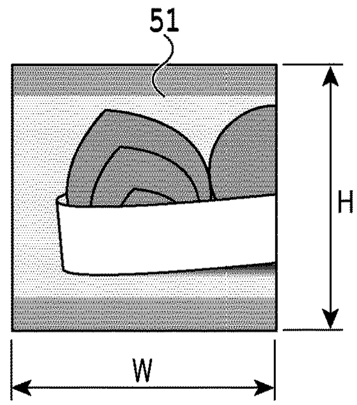

FIG. 11 is a flowchart illustrating processing of the present embodiment. Moreover, FIGS. 12A to 12D are views illustrating the print data in the respective steps of the flow of FIG. 11. Note that, since FIGS. 12A to 12C are views in which the same processes as FIGS. 8A to 8C are performed, description thereof is omitted. The processing of the present embodiment is described below by using the flowchart of FIG. 11 and the print data of FIGS. 12A to 12D. Note that S1106 and S1109 are steps in which processes different from the processes of FIG. 7 are performed in the series of processes S1101 to S1110 of the print data creating application 91 in the present embodiment. Specifically, S1101 to S1105, S1107, S1108, and S1110 are the same as S701 to S705, S707, S708, and S710 of FIG. 7, respectively. Accordingly, S1106 and S1109 are mainly described below. The other steps in which the same processes as those in FIG. 7 are performed are appropriately described as necessary.

Figure 12D:
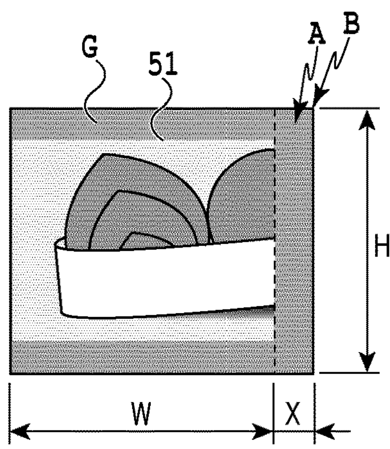

In S1106, the information processing apparatus 2001 duplicates pixels with the same color as the background color G for X in the width direction and adds the region A on the binding portion B side of the left page as illustrated in FIG. 12D. Note that X in FIG. 12D denotes the width of the added region A and can be set as described above depending on the steps and the performance of the post-processing apparatus 3010. After the print data region A is added in S1106, in S1107, the information processing apparatus 2001 outputs the processed page as the print data of the left page. In the case where the print data of the left page is outputted in S1107, the processing then transfers to the process of the right page.

In S1109, the information processing apparatus 2001 duplicates pixels with the same color as the background color G for X in the width direction and adds the region A on the binding portion B side of the right page as in the left page. After the print data region A is added in S1109, in S1110, the information processing apparatus 2001 outputs the processed page as the print data of the right page.

That is the description of the print data creation in the present embodiment. As described above, in the present embodiment, it is possible to duplicate pixels with the same color as the background color and create the print data in the added regions for bookbinding in the binding portion. This can eliminate a seam in the print region of the binding portion and improve quality in a product bound into a book by outputting data in unit of one page as in the perfect binding product.

Embodiment 3

Next, Embodiment 3 is described. The present embodiment is different from Embodiment 1 in that the added regions are created by using the background pattern instead of the nearby images.

Figure 13:
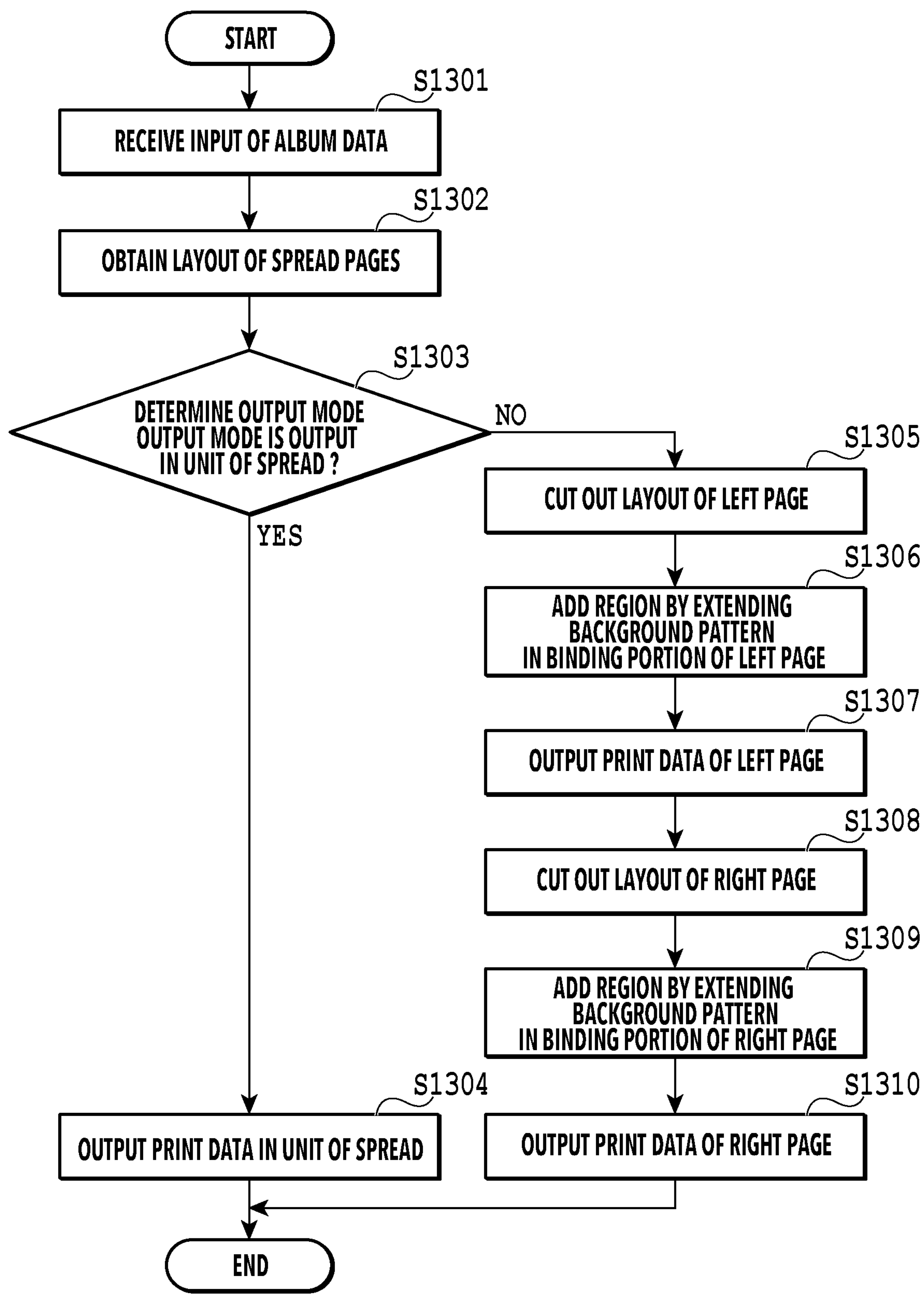
FIG. 13 is a flowchart illustrating processing of the print data creating software.
Figure 14A:
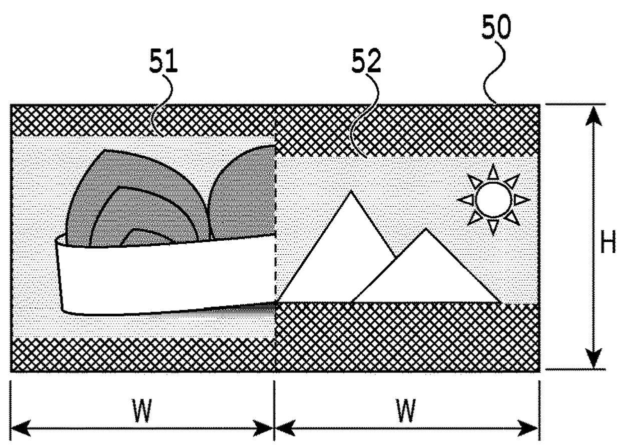
FIGS. 14A to 14D are views illustrating an example of the print data outputted by the print data creating software.
Figure 14B:
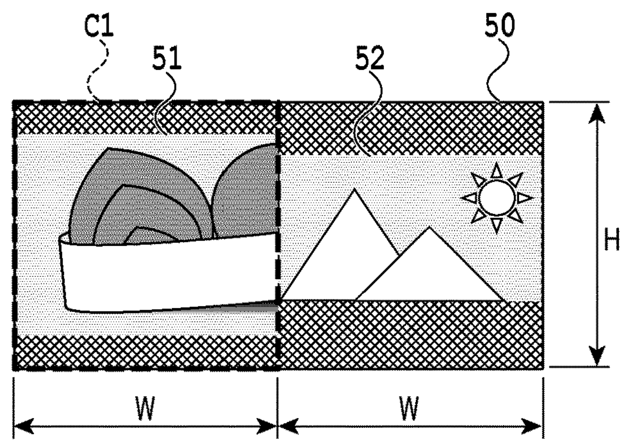
Figure 14C:
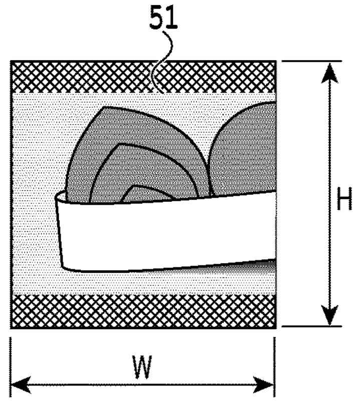

FIG. 13 is a flowchart illustrating processing of the present embodiment. Moreover, FIGS. 14A to 14D are views illustrating the print data in the respective steps of the flow of FIG. 13. Note that, since FIGS. 14A to 14C are views in which the same processes as FIGS. 8A to 8C are performed, description thereof is omitted. The processing of the present embodiment is described below by using the flowchart of FIG. 13 and the print data of FIGS. 14A to 14D. Note that S1306 and S1309 are steps in which processes different from the processes of FIG. 7 are performed in the series of processes S1301 to S1310 of the print data creating application 91 in the present embodiment. Specifically, S1301 to S1305, S1307, S1308, and S1310 are the same as S701 to S705, S707, S708, and S710 of FIG. 7, respectively. Accordingly, S1306 and S1309 are mainly described below and, for the other steps in which the same processes as those in FIG. 7 are performed, only the necessary portions are described as appropriate.

Figure 14D:
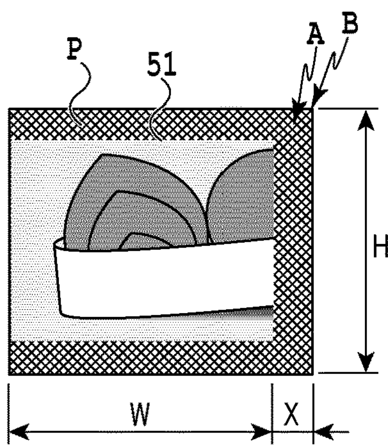

In S1306, the information processing apparatus 2001 duplicates pixels with the same pattern as the background pattern P for X in the width direction and adds the region A on the binding portion B side of the left page as illustrated in FIG. 14D. Note that X in FIG. 14D denotes the width of the added region A and can be set as described above depending on the steps and the performance of the post-processing apparatus 3010. After the print data region A is added in S1306, in S1307, the information processing apparatus 2001 outputs the processed page as the print data of the left page. In the case where the print data of the left page is outputted in S1307, the processing then transfers to the process of the right page.

In S1309, the information processing apparatus 2001 duplicates pixels with the same pixel as the background pattern P for X in the width direction and adds the region A on the binding portion B side of the right page as in the left page. After the print data region A is added in S1309, in S1310, the information processing apparatus 2001 outputs the processed page as the print data of the right page.

As described above, according to the present embodiment, it is possible to duplicate pixels with the same pattern as the background pattern and create the print data in the added regions for bookbinding in the binding portion. This can eliminate a seam in the print region of the binding portion and improve quality in a product bound into a book by outputting data in unit of one page as in the perfect binding product.

Embodiment 4

Next, Embodiment 4 is described. The present embodiment is different from Embodiment 1 in that the added regions are not created by extending the nearby images but the pixels of the added regions are created to be line-symmetric with a straight line (hereinafter, referred to as axis of symmetry) set at a predetermined position in the spread being an axis.

Figure 15:
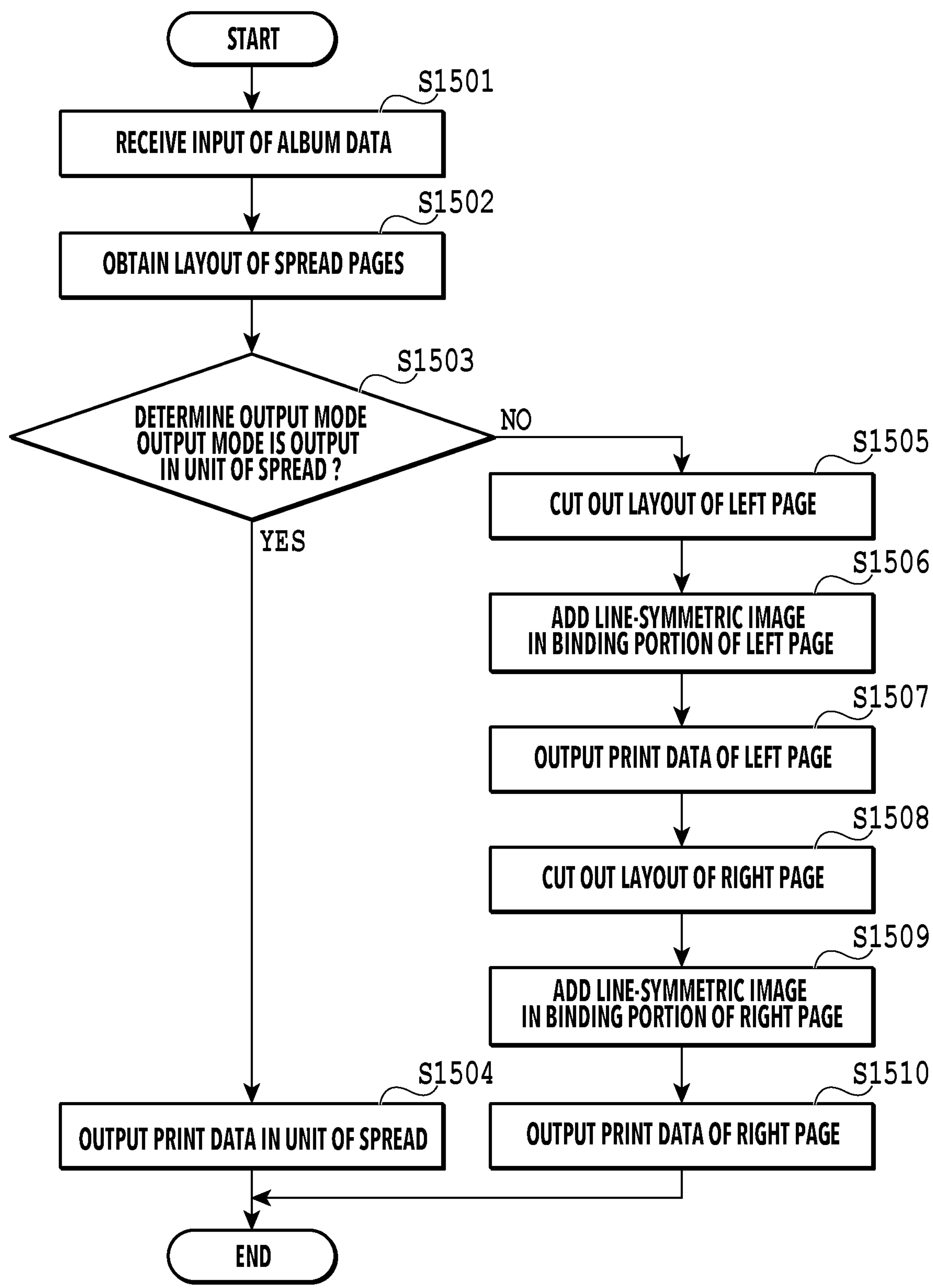
FIG. 15 is a flowchart illustrating processing of the print data creating software.
Figure 16A:
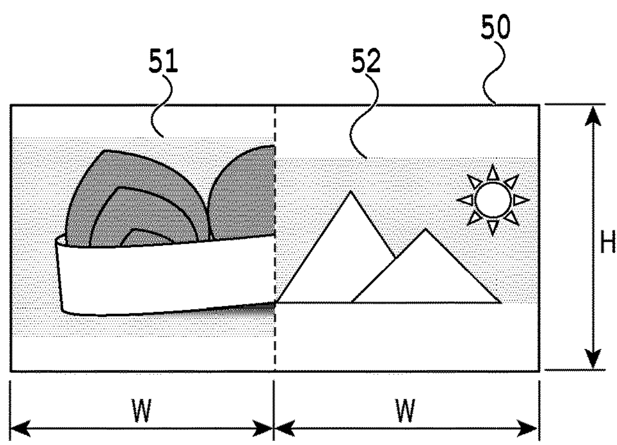
FIGS. 16A to 16D are views illustrating an example of the print data outputted by the print data creating software.
Figure 16B:
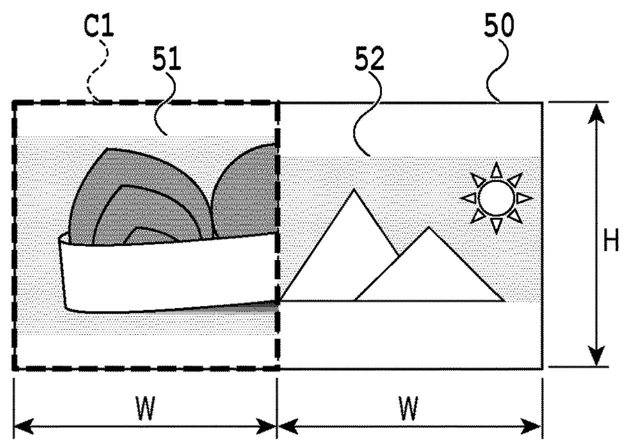
Figure 16C:
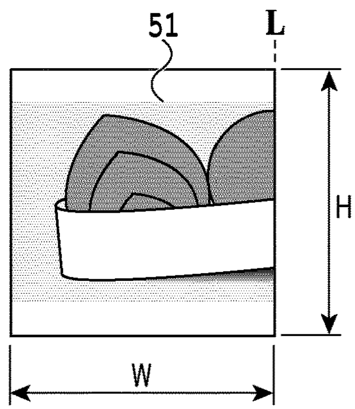

FIG. 15 is a flowchart illustrating processing of the present embodiment. Moreover, FIGS. 16A to 16D are views illustrating the print data in the respective steps of the flow of FIG. 15. Note that, since FIGS. 16A to 16C are views in which the same processes as FIGS. 8A to 8C are performed, description thereof is omitted. The processing of the present embodiment is described below by using the flowchart of FIG. 15 and the print data of FIGS. 16A to 16D. Note that S1506 and S1509 are steps in which processes different from the processes of FIG. 7 are performed in the series of processes S1501 to S1510 of the print data creating application 91 in the present embodiment. Specifically, S1501 to S1505, S1507, S1508, and S1510 are the same as S701 to S705, S707, S708, and S710 of FIG. 7, respectively. Accordingly, S1506 and S1509 are mainly described below and, for the other steps in which the same processes as those in FIG. 7 are performed, only the necessary portions are described as appropriate.

Figure 16D:
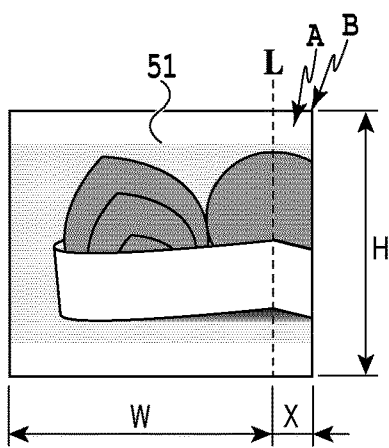

In S1506, the information processing apparatus 2001 duplicates symmetric pixels based on the axis of symmetry L set at the predetermined position in the spread for X in the width direction and adds the region A on the binding portion B side of the left page as illustrated in FIG. 16D. Note that X in FIG. 16D denotes the width of the added region A and can be set as described above depending on the steps and the performance of the post-processing apparatus 3010. After the print data region A is added in S1506, in S1507, the information processing apparatus 2001 outputs the processed page as the print data of the left page. In the case where the print data of the left page is outputted in S1507, the processing then transfers to the process of the right page.

In S1509, the information processing apparatus 2001 duplicates symmetric pixels based on the axis of symmetry L set at the predetermined position in the spread for X in the width direction and adds the region A on the binding portion B side of the right page as in the left page. After the print data region A is added in S1509, in S1510, the information processing apparatus 2001 outputs the processed page as the print data of the right page.

As described above, according to the present embodiment, it is possible to duplicate symmetric pixels based on the axes of symmetry in the spread and create the print data in the added regions for bookbinding in the binding portion. This can eliminate a seam in the print region of the binding portion and enable smooth output of a circular arc configuration to improve quality in a product bound into a book by outputting data in unit of one page as in the perfect binding product.

Embodiment 5

Next, Embodiment 5 is described. The present embodiment is different from Embodiment 1 in that the added regions are not created by extending the nearby images but are created by using part of the adjacent page in the spread in bookbinding.

Figure 17:
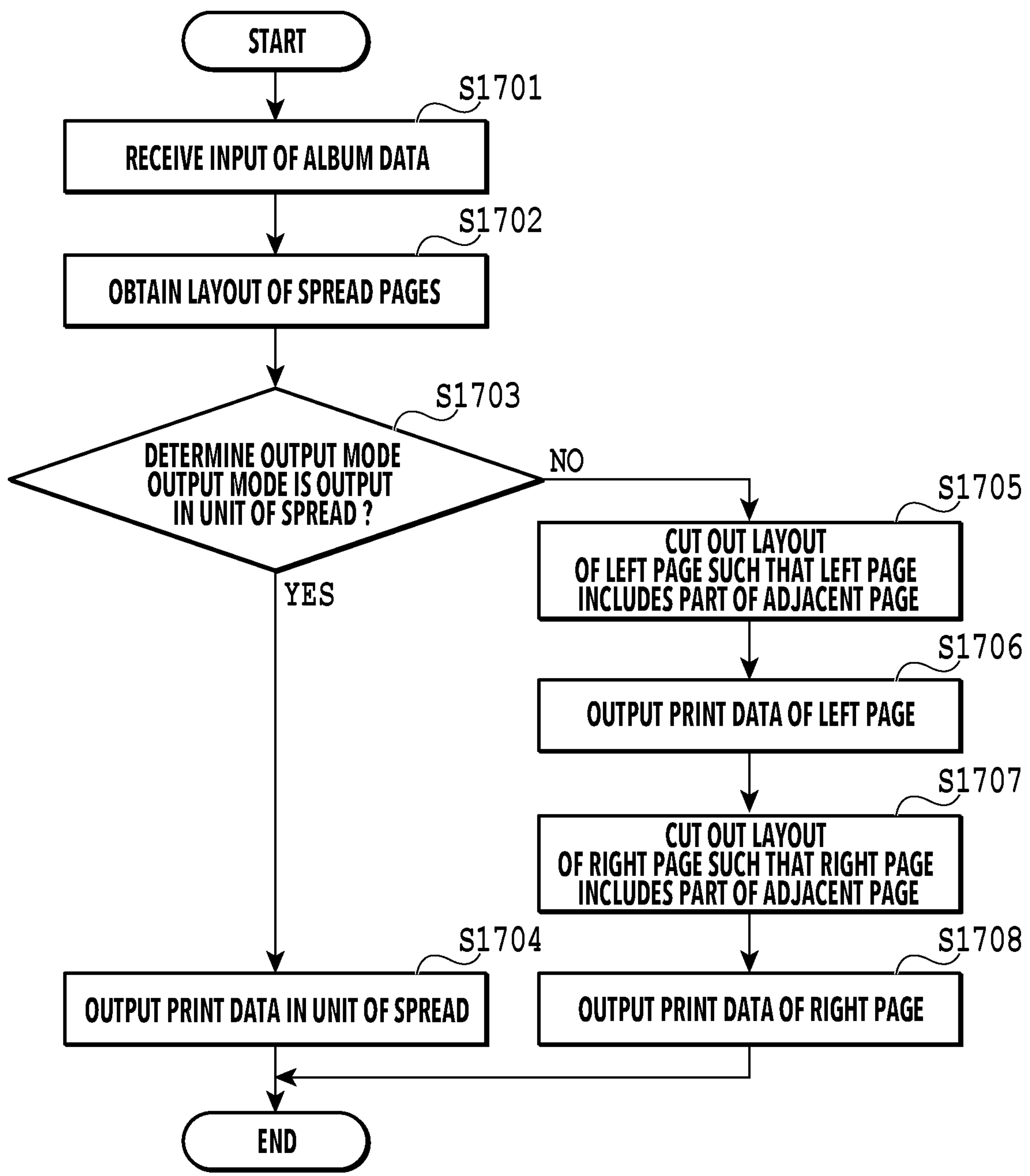
FIG. 17 is a flowchart illustrating processing of the print data creating software.
Figure 18A:
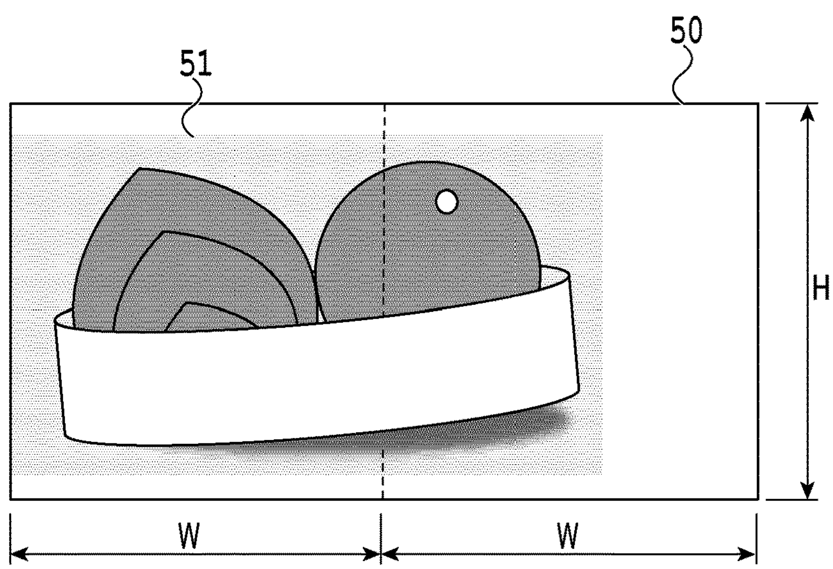
FIGS. 18A to 18C are views illustrating an example of the print data outputted by the print data creating software.
Figure 18B:
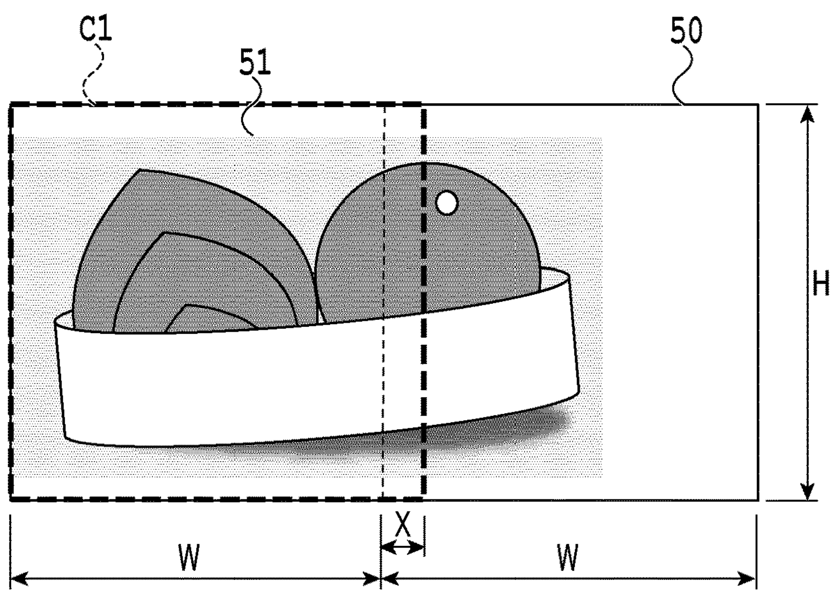
Figure 18C:
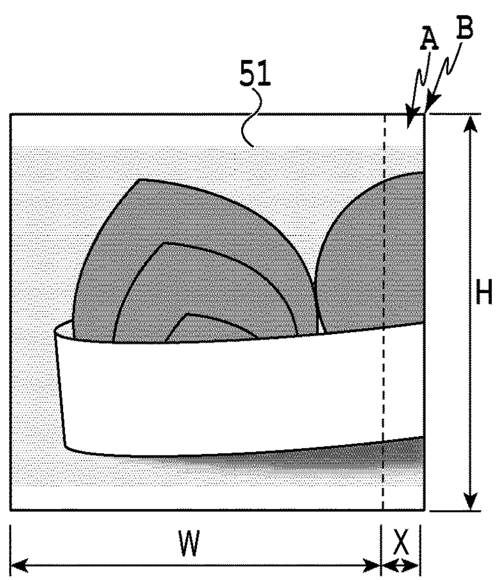

FIG. 17 is a flowchart illustrating processing of the present embodiment. Moreover, FIGS. 18A to 18C are views illustrating the print data in the respective steps of the flow of FIG. 17. The processing of the present embodiment is described below by using the flowchart of FIG. 17 and the print data of FIGS. 18A to 18C. Note that, since S1701 to S1704 in the present flow are the same processes as S701 to S704 in FIG. 7, description thereof is omitted.

In S1705, the information processing apparatus 2001 performs the process of cutting out the left page in the cutout region C1 such that the left page includes part (width X) of the adjacent page as illustrated in FIG. 18B. FIG. 18C is data after the process of cutting out the left page in S1705. Note that X in FIG. 18C denotes the width of the added region A and can be set as described above depending on the steps and the performance of the post-processing apparatus 3010. After the cutout process in S1705 is performed, in S1706, the information processing apparatus 2001 outputs the processed page as the print data of the left page. In the case where the print data of the left page is outputted in S1706, the processing then transfers to the process of the right page. Since the flow of the process of the right page is the same as that of the left page described above, detailed description using illustrations is not given and description is given by using the flowchart of FIG. 17.

In S1707, the information processing apparatus 2001 performs the process of cutting out the right page from the layout of the spread such that the right page includes part (width X) of the adjacent page. After the cutout process in S1707 is performed, in S1708, the information processing apparatus 2001 outputs the processed page as the print data of the right page.

As described above, according to the present embodiment, the print data is created to include part of the adjacent page in the added regions for bookbinding in the binding portion. This can eliminate a seam in the print region of the binding portion and improve visual quality of an image arranged across the spread to improve the quality in a product bound into a book by outputting data in unit of one page as in the perfect binding product. Description is given above of the case where the embodiment is applied to both of the left and right pages in the spread. However, in practice, if the embodiment is applied to both pages, an image in which the added regions appear to be separated from the respective pages may be obtained and have poor appearance depending on the image arranged in the spread. In such a case, it is desirable to create the added region by using part of the adjacent page in one of the left and right pages. In this case, the added region in the other page is desirably created by employing one of the aforementioned Embodiments 1 to 4 depending on the image.

Other Embodiments

The print data creating application 91 may include more than one of the functions of the aforementioned five embodiments. Switching between the aforementioned five embodiments or determination of not performing the processing may be performed depending on the layout state, for example, an arrangement pattern of pictures or the background pattern. Moreover, although the case where the processing is performed while focusing one spread in the album is described in the aforementioned embodiments, in practice, the processing of the embodiments is repeated for all spreads. In this process, for example, the embodiment to be used may vary between the spreads. Moreover, the configuration may be such that the user can set the embodiment to be used as appropriate.

In the aforementioned five embodiments, in the determination of performing spread output or not in the output mode determination, the determination is performed based on whether the binding method is the perfect binding or not. However, the present disclosure is not limited to this. The determination may be performed depending on whether a spread attribute included in the album data is a spread output attribute or not. For example, the spread output of the displayed pages may be determined to be performed also in the case of perfect binding.

Moreover, although the album editing application 90 and the print data creating application 91 are held in the separate information processing apparatuses in the aforementioned five embodiments, these applications may be held in the same information processing apparatus.

Furthermore, although the album editing application 90 and the print data creating application 91 are described as separate applications, the functions of these applications may be held as the same application.

Moreover, although the aforementioned embodiments are described to be executed by using the print data creating application 91, the present disclosure is not limited to this. For example, the processes of the aforementioned embodiments may be executed by using a layout editing application that newly arranges object data.

Moreover, although description is given by using the album as an example of the book in the aforementioned embodiments, the present disclosure is not limited to this. For example, the book may be a book such as a picture book or a comic book. The album data is merely an example and the present disclosure can be applied to any book data including multiple pages.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-069642, filed Apr. 16, 2021, which is hereby incorporated by reference herein in its entirety.

What is claimed is:

1. An information processing apparatus comprising:

at least one memory and at least one processor which function as a plurality of units comprising:

(1) an obtaining unit configured to obtain book data;

(2) a providing unit configured to provide an additional image based on the book data to a binding portion of a specific page in the book data; and (3) an output unit configured to output data including the specific page including the additional image provided by the providing unit, wherein the additional image is at least one of (a) an image generated by duplicating pixels within a specific range from the binding portion in an arranged image arranged in the specific page, (b) an image using a background color of the specific page, (c) an image using a background pattern of the specific page, and (d)

an image that is line-symmetric with a straight line set at a predetermined position in the specific page being an axis.

2. The information processing apparatus according to claim 1, wherein the providing unit provides the additional image based on the book data in the case where one spread included in the book data is to be cut out as a plurality of pages and printed.

3. The information processing apparatus according to claim 1, wherein the providing unit provides the additional image to the binding portion of the specific page such that no seam is formed between the additional image and the arranged image arranged in the specific page.

4. The information processing apparatus according to claim 1, wherein the providing unit provides the additional image to the binding portion without changing a slot size of the arranged image in the specific page.

5. The information processing apparatus according to claim 1, wherein the additional image is an image generated by duplicating pixels within a specific range from the binding portion in the arranged image arranged in the specific page.

6. The information processing apparatus according to claim 1, wherein the additional image is an image using a background color of the specific page.

7. The information processing apparatus according to claim 1, wherein the additional image is an image using a background pattern of the specific page.

8. The information processing apparatus according to claim 1, wherein the additional image is an image that is line-symmetric with a straight line set at a predetermined position in the specific page being an axis.

9. The information processing apparatus according to claim 1, wherein the additional image is further based on an image obtained by extending part of an image in an adjacent page forming a spread with the cut-out page in bookbinding.

10. The information processing apparatus according to claim 1, wherein the book data is album data including a plurality of pages in which images are arranged, and wherein the obtaining unit obtains the album data via the Internet.

11. The information processing apparatus according to claim 1, wherein the plurality of units further comprises a cutout unit configured to cut out a page based on the book data, and wherein the specific page is a page cut out by the cutout unit.

12. A non-transitory computer-readable storage medium storing a program which causes a computer to function as a plurality of units comprising:

an obtaining unit configured to obtain book data;

a providing unit configured to provide an additional image based on the book data to a binding portion of a specific page in the book data; and an output unit configured to output data including the specific page including the additional image provided by the providing unit, wherein the additional image is at least one of (a) an image generated by duplicating pixels within a specific range from the binding portion in an arranged image arranged in the specific page, (b) an image using a background color of the specific page, (c) an image using a background pattern of the specific page, and (d) an image that is line-symmetric with a straight line set at a predetermined position in the specific page being an axis.

13. The storage medium according to claim 12, wherein the providing unit provides the additional image based on the book data in the case where one spread included in the book data is to be cut out as a plurality of pages and printed.

14. The storage medium according to claim 12, wherein the providing unit provides the additional image to the binding portion of the specific page such that no seam is formed between the additional image and the arranged image arranged in the specific page.

15. The storage medium according to claim 12, wherein the providing unit provides the additional image to the binding portion without changing a slot size of the arranged image in the specific page.

16. The storage medium according to claim 12, wherein the additional image is an image generated by duplicating pixels within a specific range from the binding portion in the arranged image arranged in the specific page.

17. The storage medium according to claim 12, wherein the additional image is an image using a background color of the specific page.

18. The storage medium according to claim 12, wherein the additional image is an image using a background pattern of the specific page.

19. The storage medium according to claim 12, wherein the additional image is an image that is line-symmetric with a straight line set at a predetermined position in the specific page being an axis.

20. The storage medium according to claim 12, wherein the additional image is further based on an image obtained by extending part of an image in an adjacent page forming a spread with the cut-out page in bookbinding.

21. The storage medium according to claim 12, wherein the book data is album data including a plurality of pages in which images are arranged, and wherein the obtaining unit obtains the album data via the Internet.

22. A control method of an information processing apparatus, the control method comprising:

obtaining book data;

providing an additional image based on the book data to a binding portion of a specific page in the book data; and outputting data including the specific page including the additional image provided in the providing, wherein the additional image is at least one of (a) an image generated by duplicating pixels within a specific range from the binding portion in an arranged image arranged in the specific page, (b) an image using a background color of the specific page, (c) an image using a background pattern of the specific page, and (d) an image that is line-symmetric with a straight line set at a predetermined position in the specific page being an axis.

23. The storage medium according to claim 12, wherein the plurality of units further comprises a cutout unit configured to cut out a page based on the book data, and wherein the specific page is a page cut out by the cutout unit.

* * * * *